(12) United States Patent
Eshkoli et al.

(10) Patent No.: US 7,139,015 B2
(45) Date of Patent: Nov. 21, 2006

(54) METHOD AND APPARATUS FOR MIXING COMPRESSED VIDEO

(75) Inventors: Noam Eshkoli, Tel Mond (IL); Oded Gants, Doar Na Lev Hashomron (IL)

(73) Assignee: Polycom, Inc., Pleasanton, CA (US)

( * ) Notice: Subject to any disclaimer, the term of this patent is extended or adjusted under 35 U.S.C. 154(b) by 82 days.

(21) Appl. No.: 10/761,718

(22) Filed: Jan. 20, 2004

(65) Prior Publication Data

US 2005/0157164 A1 Jul. 21, 2005

(51) Int. Cl.
*H04N 7/14* (2006.01)
(52) U.S. Cl. .................. 348/14.07; 348/14.08; 348/14.13
(58) Field of Classification Search .. 348/14.01–14.09, 348/14.1, 14.11–14.13; 370/260, 261, 263
See application file for complete search history.

(56) References Cited

U.S. PATENT DOCUMENTS

| | | | |
|---|---|---|---|
| 5,600,646 A | 2/1997 | Polomski | 370/263 |
| 5,675,393 A | 10/1997 | Chida | 348/598 |
| 5,764,277 A | 6/1998 | Loui et al. | 348/14 |
| 5,838,664 A | 11/1998 | Polomski | 370/263 |
| 6,288,740 B1 * | 9/2001 | Lai et al. | 348/14.09 |
| 6,300,973 B1 | 10/2001 | Feder | 348/14.09 |
| 6,496,216 B1 | 12/2002 | Feder | 348/14.09 |
| 2001/0019354 A1 | 9/2001 | Torbjorn | 348/14.09 |
| 2003/0099294 A1 * | 5/2003 | Wang et al. | 375/240.15 |
| 2003/0123537 A1 | 7/2003 | Yona | 375/240.01 |

FOREIGN PATENT DOCUMENTS

EP 1 381 237 A2 1/2004

OTHER PUBLICATIONS

Wiegant T., et al. "Draft ITU-T Recommendation and Final Draft International Standard of Joint Video Specification (*ITU-T Rec. H.264/ISO/IEC 14496-10ACV*)" Apr. 2, 2003, Joint Video Team of ISO/IEC MPEG & ITU-T VCEG (ISO/IEC JTC1/SC29/WG11 and ITU-T SG16 Q6).
Search report for European patent application No. 04025134.0-223, dated Nov. 23, 2005.

* cited by examiner

*Primary Examiner*—Melur Ramakrishnaiah
(74) *Attorney, Agent, or Firm*—Wong, Cabello, Lutsch, Rutherford & Brucculeri, LLP

(57) ABSTRACT

Disclosed herein is a method and apparatus for mixing compressed video useable in a videoconferencing environment having a plurality of endpoint users. Through the use of the method and apparatus, each endpoint can receive a unique layout displaying some subset of the users at the endpoints. Input streams from each endpoint are uncompressed, resized, and scaled to fit the segment in the layout for particular endpoints, and then encoded (or compressed) by a sub-encoder into a sub-encoded stream according to the compression parameters. Each sub-encoded streams is further encoded and associated with a position in the layout. Different layouts may be sent to different conferees, and different compression standards may be used for each endpoint.

23 Claims, 7 Drawing Sheets

METHOD AND APPARATUS FOR MIXING COMPRESSED VIDEO

BACKGROUND

1. Field of the Invention

The present invention relates to video communication and more particularly to a method and an apparatus for mixing bit streams of compressed video from more than one video source.

2. Description of the Prior Art

Video communication between more than two video terminals often requires a Multipoint Control Unit (MCU), a conference controlling entity that typically is a piece of equipment located in a node of a network or in a terminal which receives several channels from access ports and, according to certain criteria, processes audio visual signals and distributes them to a set of connected channels. Examples of MCUs include the MGC-100, which is available from Polycom Networks Systems Group. A terminal (which may be referred to as an endpoint) is an entity on the network, capable of providing real-time, two-way audio and/or visual communication with other terminals or the MCU.

The MCU may include a bank of decoders, encoders, and bridges. The MCU may use a large amount of processing power to handle video communications between a variable number of participants, using a variety of communication and compression standards and a variety of bit streams, for example. The MCU may need to compose these bit streams into at least one single output stream that is compatible with the requirements of at least one conference participant to which the output stream is being sent.

A conference may have one or more video output streams. Each output stream is associated with a layout. A layout defines the appearance of a conference on a screen (display) of conferees that receive the stream. A layout may be divided into one or more segments. Each segment may be associated with the video that is sent by a certain conferee. The association between the segment and the conferee may be dynamically changed during a conference.

Each output stream may be constructed of several input streams. Such a conference may be called "continuous presence" (CP). In a CP conference a user at a remote terminal can observe, simultaneously, several other participants in the conference. Each participant may be displayed in a segment of the layout. The segments may be in the same size or may be in different sizes. The choice of the participants that are associated with the segments of the layout may be varied among different conferees. In this situation, the amount of bits allocated to each segment can also vary and may depend on the video activity in the segment, on the size of the segment, or some other criteria.

Following are few examples of conference layout. A layout that a current speaker receives may include (in the segment that is associated with the speaker) video of the previous speaker instead of the video of the current speaker (i.e., himself), while the other conferees receive the video of the current speaker. In some conferences two or more conferees may have different layouts. Therefore a video stream that arrives from a certain conferee may be displayed in different segments (location and/or sizes) in the layouts that are sent to different conferees.

Thus, an MCU may need to decode each input stream into uncompressed video of a full frame; manage the plurality of uncompressed video streams that are associated with the conferences; and manage a plurality of output streams, in which each output stream may be associated with a conferee or a certain layout. The output stream may be generated by a video port. A video port may have a layout builder and an encoder. The layout builder may scale the different uncompressed video frames into their final size and place them into their segment in the layout. Then, the video of the composed video frame is encoded by the encoder.

Consequently processing and managing a plurality of videoconferences require heavy and expensive computational resources. Therefore an MCU is typically an expensive and rather complex product. Common MCUs are disclosed in several patents and patent applications, for example, U.S. Pat. Nos. 6,300,973, 6,496,216, 5,600,646, or 5,838,664, the contents of which are incorporated herein by reference. Those patents disclose the operation of a video unit in an MCU that may be used to generate the video for a CP conference.

In more recent years, videoconferencing and other forms of multimedia communications have become more commonplace. The advent of personal computers having videoconferencing capabilities creates a demand for MCUs having the capability of multimedia communication between devices. This trend raises the need for low cost MCUs, such as Software MCUs, which use a software program to compose compressed video streams into a compressed video of a CP conference without actually decoding and encoding the streams. However, low cost MCUs may only handle a limited multipoint communication (e.g. a limited number of compression standards, a limited number of conferees, and a limited number of layouts).

For example, U.S. Pat. No. 5,675,393, which is incorporated herein by reference, discloses an image processing apparatus for composing a plurality of Quarter Common Intermediate Format (QCIF) coded images into one CIF image without decoding the plurality of coded images when the images are transmitted using the H.261 standard. QCIF is a videoconferencing format that specifies a video frame containing 144 lines and 176 pixels per line, which is one-fourth the resolution of Common Intermediate Format (CIF). QCIF support is required by some of the International Telecommunications Union (ITU) videoconferencing standards.

U.S. patent application Ser. No. 09/768,219, published as U.S. Pub. No. 2001/0019354A1 and entitled "Method and an Apparatus for Video Mixing of Bit Streams," and which is incorporated herein by reference, discloses a method and apparatus for mixing as many as four QCIF H.263 compressed video bit streams into a composite CIF image.

Moreover, U.S. patent application Ser. No. 10/310,728, entitled "Method and an Apparatus for Mixing Compressed Video," which is incorporated herein by reference, discloses a method and apparatus for mixing QCIF H.263, Annex K compressed video bit streams into a composite CIF image or 4CIF image.

However, those methods and apparatus offer limited functionalities. For example, the segment size of each one of the conferees in the layout is the same size as his input stream. In case of mixing QCIF images into a CIF, the layout of the output frame is limited to up to four conferees and the frame portion that is associated with each one of the up to four conferees is a quarter of the output frame.

Furthermore, those methods require that compression of input streams and output streams are accomplished using the same compression algorithm. Therefore, there is a need for a method and apparatus that can offer flexible layouts, can display flexible number of conferees simultaneously, and can handle different input and output video compression algorithms and/or the different bit rates with reducing the cost of an MCU.

SUMMARY OF THE INVENTION

The present invention overcomes the above-described need in the prior art by providing a new architecture and a method for mixing a plurality of compressed input video streams into one or more compressed video output streams of CP layouts of a conference.

An exemplary embodiment of the present invention may decode a compressed input stream that is received from a conferee that may take part in a layout received by another conferee during a conference session. The decoding may be done by a decoder that decodes the input stream into uncompressed video (open video) in the spatial domain (image domain) or in the transform domain (i.e. the DCT domain). (It should be noted that the terms "uncompressed video" or "open video" and "decoded video" may be used interchangeably herein.) The uncompressed video from the decoder may be resized into scaled video by one or more scalers. (It should be noted that the terms "resized" and "scaled" may be used interchangeably herein.) Each scaler may change the resolution of the uncompressed stream into a resolution that fits the size of a segment in a layout in which the image of the conferee may be displayed. The number of scalers allocated to an input video from a conferee depends on the number of different sizes of segments in which the conferee may be observed by other conferees.

Each one of the scaled video streams is encoded (or compressed) by a sub-encoder into a sub-encoded stream. (it should be noted that the terms "encoded" and "compressed" may be used interchangeably herein.) The compression is done according to the compression parameters that are set in a negotiation between the MCU and the endpoints during establishment of the session. A sub-encoder may be needed for each set of compression parameters that are currently used. Compression parameters may be parameters such as the compression standard, the bit rate, frame rate, etc., but are not limited thereto.

Each one of the sub-encoded streams is encoded, as it is associated with a segment that is displayed in the top left corner of the layout. The final location-dependent information for each one of the sub-encoded streams may be corrected and adapted to its final location in the layout during creation of the output stream that is sent to the endpoint. The location-dependent information may include information such as macro blocks (MB) address (MBA), first MB in slice, motion vectors, quantizer, etc. but is not limited thereto. More information about location-dependent information may be found in compression standards such as H.261, H.263, H.264, etc., or MPEG standards such as "MPEG 4, part 10," but is not limited thereto. More information about those standards may be found at www.itu.int and www.mpeg.org, whose relevant contents are incorporated herein by reference.

Each one of the sub-encoded streams may be transferred to a Sub-Encoded Common Interface (SECI). The appropriate sub-encoded streams may be used by one or more output modules. Each output module may compose a single compressed video stream with a certain layout and according to a certain compression parameter set. Therefore, each output module may be associated with a certain conference, layout, conferee, and/or a compression parameter set depending on the requirements of the conference.

The output module may get the appropriate sub-encoded streams from the SECI and modifies the location-dependent information in each one of the sub-encoded streams. The modification is accomplished according to the final location of their associated segment in the layout that is generated by the output module. The output module may add, if needed, some artificial video data such as background, empty segments, etc. Then, the output stream is sent via compressed video common interface (CVCI) to its destination.

By using the present invention, different layouts may be sent to different conferees. Different compression standards may be used and a conferee may be displayed in different sizes in different segments within CP layouts. Furthermore, the present invention requires less computational resources than conventional methods since the encoding is done on a segment of a layout and is done only once per size of a conferee's layout or once per compression parameter set that is currently used.

BRIEF DESCRIPTION OF THE DRAWINGS

The invention will be more readily understood from reading the following description and by reference to the accompanying drawings (forming a part of the description), wherein an example of the invention is shown.

DESCRIPTION OF THE INVENTION

Figure 1A:
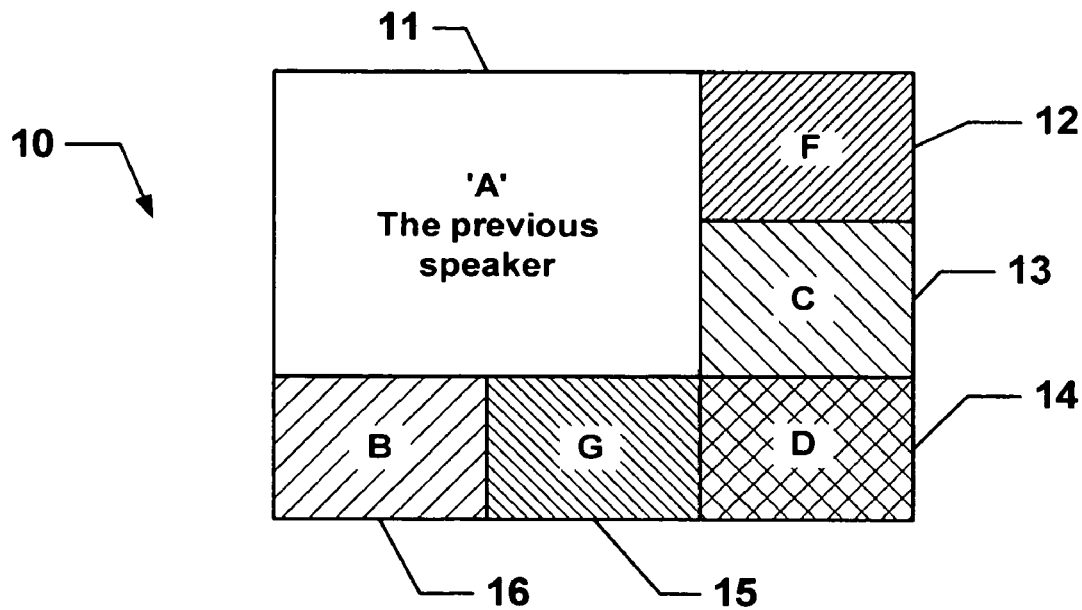
FIG. 1a shows exemplary layouts in a conference.

Referring now to the drawings, in which like numerals refer to like parts throughout the several views, exemplary embodiments of the present invention are described.

An embodiment of the invention is described using an example including a detailed description of a video conference module in an MCU that multiplexes two or more compressed video frames into one or more single frame using H.264 as the compression standard. However, the example is not intended to limit the scope of the invention. The H.264 compression standard is used only as an example. Other standards may be used such as, but not limited to, H.263, MPEG 4, part 10, etc.

The present invention can support different conference layouts, and more than one layout for a conference. Exemplary snapshot of two layouts 10, 20 of a conference with seven conferees, conferee 'A' to conferee 'G', are illustrated in FIG. 1a. The conference has been defined with the following requirements: each participant can see the other six and cannot see himself. Furthermore, the current speaker sees the previous speaker and not himself. The layout comprises six segments, 11 to 16. Layout 10 illustrates the screen of participant 'E' who is the current speaker and Layout 20 illustrates the screen of participant 'A' that was the previous speaker. The layouts and screens may be changed automatically during the conference, for example, when the speaker is changed or when a new conferee joins the conference. The layout may also be changed manually upon receiving a command to change the layout. Such a command may be initiated by a participant, a videoconference moderator or a videoconference operator.

The exemplary layout has segments in two sizes; one large segment 11 and five small segments 12 to 16. The large segment 11 may be associated with a speaker. During the time of the snapshot, conferees 'B', 'C', 'D', 'F' and 'G' are associated with segments 12 to 16 respectively. However this association may be changed during the session when one conferee from this group becomes the speaker.

Moreover, five other layouts may be used in this conference, the layouts that are associated with the rest of the conferees ('B', 'C', 'D', 'F' and 'G'). In those layouts (not shown), one of the small segments 12 to 16, which is associated with the conferee that received this layout, displays the previous speaker ('A'). In such a conference no conferee sees himself. Moreover, in such a conference the previous speaker may be displayed in two sizes and in six different segments. Since any one of the conferees may be the speaker in a random sequence, at a certain period of time any conferee may be associated with different segment in different layouts, as is seen by the different segments of conferees 'B' and 'F' in layouts 10 and 20. Layouts 10 and 20 are provided by way of example and are not intended to limit the scope of the invention; other type of layouts with other numbers and sizes of segments may be used.

Figure 1A:
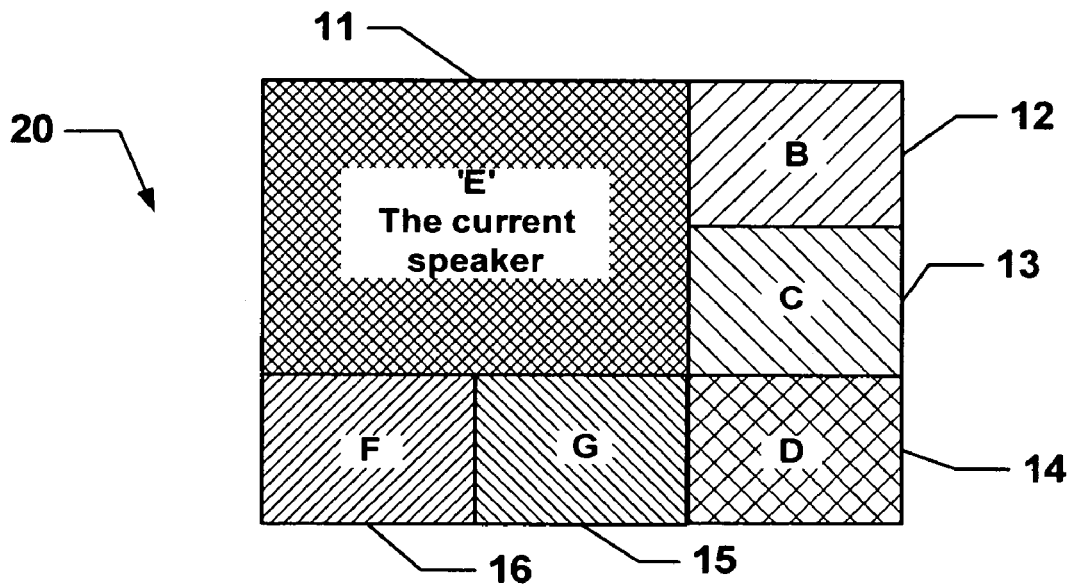
Figure 1B:
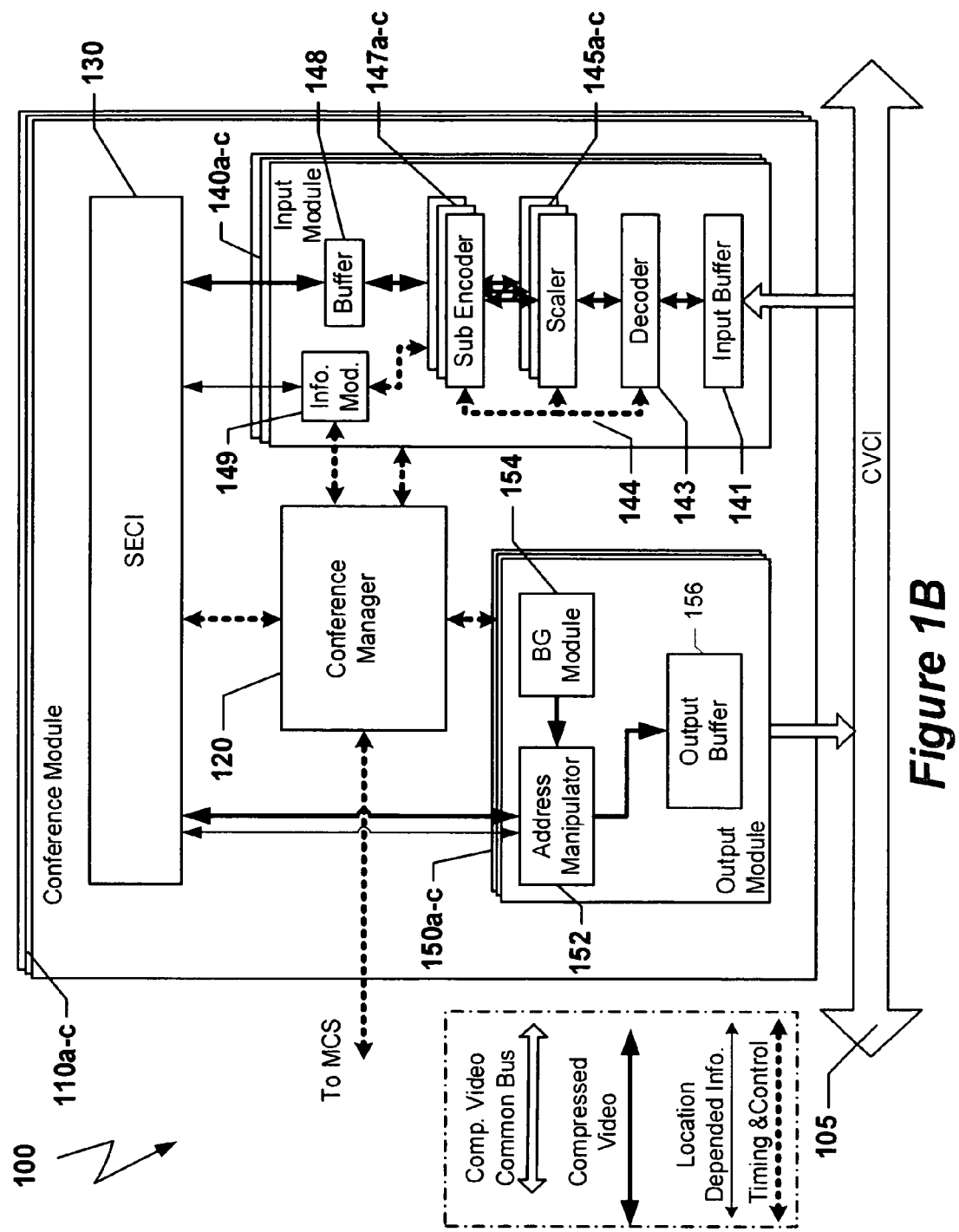
FIG. 1b is a block diagram illustrating an exemplary embodiment of a conferencing module according to the present invention.

FIG. 1b is a block diagram of a section of an exemplary MCU 100, which may process and manage the video of a conference according to an exemplary embodiment of the present invention. An MCU 100 may include a compress video common interface (CVCI) 105 and a plurality of conference modules 110a–c. Each module may have a conference manager 120 (CM), a sub-encoded common interface (SECI) 130, a plurality of input modules 140a–c, and a plurality of output modules 150a–c. Each input module 140 may include an input buffer 141, a decoder 143, one or more scalers 145a–c, one or more sub-encoders 147a–c, an output buffer 148 and an information module 149. Each output module 150 may include an address manipulator module (AMM) 152, a background module (BM) 154, and an output buffer 156. Three conference modules 110a–c, input modules 140a–c, scalers 145a–c, sub-encoders 147a–c, and output modules 150a–c are shown in FIG. 1b by way of example, although any number other than three of those modules may be used with embodiments of the present invention.

A plurality of endpoints, terminals, (not shown) may be connected over one or more communication networks (not shown) to the MCU 100. (It should be noted that the terms "endpoints" and "terminals" are used interchangeably herein). The endpoints may send and receive their compressed video stream to the appropriate conference module 110a–c via Network Interface Modules (not shown) and CVCI 105. The communication networks may be packet-based networks and/or circuit-switched networks. The network can handle ISDN, ATM, PSTN, cellular, and/or IP protocols, etc. The present invention is not limited to the type of the communication protocol or to the physical embodiment of those networks.

The CVCI 105, which routes the compressed video stream between the input modules 140, the output modules 150 and the network interface modules (not shown), can be a TDM bus, a packet-based bus (such as an ATM bus or IP bus), a serial bus, a parallel bus, a connection switching bus, a shared memory bus, a direct connection bus, or like buses.

The operation of conference module 110 may be controlled by a central control unit (not shown), referred to herein as a Management Conference System (MCS). The MCS may be a host computer or internal module of the MCU 100.

The conference module 110 may be a logical unit and may be a hardware module, a firmware module, a software module or any combination of these. Each module may be a permanent logical module or a temporary one, which is generated by the MCS according to the current needs. Generating temporary logical modules and allocating permanent modules according to the current needs improves the utilization of the resources of the MCU 100.

The number of the input modules 140a–c in each conference module 110 can be a fixed number or it can be a variable number that is set according to the needs of the conference associated with the conference module 110. For example, a conference may need one input module 140 for each endpoint (not shown in the drawings) that participates in the conference. In another conference, one input module 140 may be used for each currently visible participant in the relevant screen layout. For example, the number of input modules 140 in the conference module 110, which conducts the conference with the layouts that are illustrated in FIG. 1a, is seven. Each participant, 'A' to 'G', is associated with an input module 140. In an embodiment of the present invention, the number of input modules 140 in the conference and the screen layout can be dynamically changed during the conference. The association between an input module 140 and a terminal (not shown) may be temporary. An input module 140 which communicate with a terminal via CVCI 105 can be dynamically switched to another terminal by the MCS (not shown) during the conference.

Each conference module 110 may similarly include one or more output modules 150. In an exemplary embodiment of the present invention, one output module 150 is used for each endpoint that participates in the conference. Another embodiment may have one output module 150 for each type of screen layout, and may transfer its output to the endpoints using this layout. For example, in order to support the layouts of FIG. 1a, seven output modules 150 may be needed, one per each conferee to support the requirement of this conference that a conferee will not see himself. Therefore, each conferee receives its own layout.

Following is a description of the operation of an exemplary input module 140. Once a compressed input video stream from an endpoint that is associated with a certain input module 140 is placed onto the CVCI 105, the input video stream begins to accumulate in an input buffer 141. The accumulation in the buffer is accomplished according to the type of CVCI 105. For example, if the CVCI is a TDM bus, then buffer 141 may grab the appropriate input stream by sampling the CVCI 105 at the time slot that is associated with the endpoint, which is associated with the input module 140. However, buffer 141 is not mandatory; other embodiments of the present invention may accumulate the appropriate compressed input stream by other means.

Decoder 143 takes the received compressed video stream from buffer 141 and based on the encoding standards (H.264, H.263, etc.) converts it into an uncompressed video. The uncompressed video may be represented in the image (spatial) domain.

The output from the decoder 143 is transferred to one or more scalers 145a–c. The number of scalers depends on the number of different sizes of segments to which the image is assigned. In the conference that is illustrated in FIG. 1a, each conferee may be displayed in two sizes, the size of segment 11 or the size of segments 12 to 16. Therefore, for this conference two scalers 145 may be used in each input module 140. Each scaler 145 is set according to the size of its associated segment. The scaling changes the resolution according to the endpoint requirements and/or the size of the associated segment. The scaler 145 may also filter the scaled uncompressed video for picture quality preservation.

Each scaler 145 is associated with one or more sub-encoders 147. The scaled video from each scaler 145 is transferred to its associated one or more sub-encoders 147. Sub-encoder 147 generates a sub-encoded stream. The sub-encoded stream is a compressed video stream based on the compression parameters of the endpoints that will receive the composed compressed stream that includes this sub-encoded stream. Therefore, a scaler 145 may be associated with more than one sub-encoder 147. Each sub-encoder 147 may operate according to a different set of compression parameters. Each sub-encoded stream may represent the segment of the layout that is associated with the scaler and sub-encoder pair. The sub-encoding may be done under the assumption that the associated segment is placed in the top left corner of the layout (0,0) and the location-dependent information in the sub-encoded stream is set accordingly. Location-dependent information may be information such as the MB address, motion vector, quantizer, etc. as mentioned earlier. Other exemplary embodiments of the present invention may use other reference point than the top left corner (0,0) of the screen.

In some cases sub-encoders 147a–c may be configured to eliminate the use of motion vectors outside of the boundaries of its associated segment.

Each sub-encoding stream is transferred via buffer 148 to the SECI 130. However, buffer 148 is not mandatory; other embodiments may use other means for transferring the sub-encoded stream to SECI 130. The transferring is done according to the type of SECI 130. For example, if SECI 130 is a TDM bus, each sub-encoded stream is transferred during the time slot that is associated with this sub-encoded stream.

The input module 140a–c may perform transcoding operations on the compressed video stream received from the endpoints (not shown) via CVCI 105. Such transcoding may include changing the resolution, the bit rate, the frame rate, and/or the compression algorithm, etc. Transcoding may be implemented by other methods such as but not limited to open loop transcoding, frequency domain transcoding, etc.

In other exemplary embodiments of the present invention, resources of the input modules 140a–c may be dynamically set according to the current needs of the conference. For example, for the period of time (the "current period") that is illustrated in FIG. 1a, the input module 140 of conferee 'A' has two scalers 145: one for the size of segment 11 to support the layout 10 of the current speaker 'E', and one for the size of the rest of the segments 12 to 16 to support the layout of the rest of the conferees (not shown). The input module 140 of the speaker, conferee 'E', has only one scaler 145, for the size of segment 11, to support the layout of the rest of the conferees. The input module 140 of conferees 'B', 'C', 'D', 'F' and 'G', has only one scaler 145, for the size of segments 12–16.

Assume that in a later period of time conferee 'G', for example, becomes the speaker (not shown) instead of conferee 'E'. Then the resources of the input modules 140 associated with conferees 'A', 'E' and 'G' have to be adapted accordingly. The input modules 140 of the rest of the conferees 'B', 'C', 'D' and 'F' remain the same as before. One exemplary embodiment may change the association of the inputs modules of conferees 'A', 'E' and 'G'. The input module that was associated with conferee 'A' will be associated with conferee 'E' who becomes the previous speaker. The input module 140 that was associated with conferee 'E' will be associated with conferee 'G', now the current speaker. The input module that was associated with conferee 'G' will be associated with conferee 'A'. The new associations may be reflected in the setting of the CVCI 105, SECI 130 and the output module 150. Other embodiments may keep the association of the input modules 140 with their conferees while changing the internal resources of the appropriate input modules to reflect new demands. More details concerning exemplary methods for handling changes in the layout are disclosed below in conjunction with FIGS. 2 and 3.

Each scaler 145 is associated with one or more sub-encoders 147, depending on the number of compression parameters sets that are used in the conference. Therefore, an exemplary embodiment of the present invention that may change resources dynamically reduces the amount of scalers and sub-encoders. However changes in the layouts during a conference in such embodiments may require more management resources. Moreover, using such embodiments may require a request for an Intra frame from the endpoints that are affected by the changes, for example, when the association between compressed video input streams and the input modules is changed.

As noted earlier, the SECI 130, which routes the sub-encoded streams between the input modules 140 and the output modules 150, can be a TDM bus, a packet-based bus, a serial bus, a parallel bus, a connection switching bus, a shared memory bus, a direct connection bus, etc. or similar buses. Some embodiments of the present invention may use the CVCI 105 as the SECI 130.

In addition to the sub encoding the stream, the sub encoder 147 may also generate a location information stream. The information stream may carry information that indicates places in the sub-encoding stream in which location-dependent information resides or any other type of information that may support the operation of CM 120 and output module 150. This location information stream may be used later on upon composing the final layouts. The location information stream may be transferred via the information module 149 to the CM 120 and/or via SECI 130 with the sub-encoded stream to the appropriate output modules 150a–c. The present invention may use different methods to indicate the places in the sub-encoding stream in which location-dependent information may reside. One embodiment may indicate the distance, in bytes, of the location-dependent information from the Picture Start Code (PSC) field. Other embodiment may add a unique string of bytes in front of the places in the stream in which location-dependent information resides, etc. This unique string may be easily searched. The present invention is not limited to the method that indicates where location-dependent information resides.

The location information stream is not mandatory for certain compression standards. For example, when the receiving endpoint uses H.263, annex K or H.264 as the compression standard, there is no need for the location information stream or for the information module 149.

Since the decoder 143, one or more scalers 145a–c, and one or more sub-encoders 147a–c are associated together during a conference, side information from the decoder may be sent to the scaler and the sub-encoder over connection 144. Such side information may help the operation of the scaler and the sub-encoder, and may contain motion vectors, quantizer identifications, coded/uncoded decisions, filter/non-filter decisions, and other information that would be useful to the scaling and encoding of a video signal. More information on the operation and the utilization of the side information can be found in U.S. Pat. No. 6,300,973, which is incorporated herein by reference.

Following is a description of operation of an exemplary output module 150. A sub-encoded video stream from an input module 140 that is associated with an endpoint (not shown and which is to be displayed in the layout associated with the output module is placed onto the SECI 130. The sub-encoded video stream then begins to accumulate in AMM 152 together with its associated location information stream, if present. The accumulation in AMM 152 is accomplished according to the type of the SECI 130 used. For example, if SECI 130 is a TDM bus, AMM 152 may grab the appropriate sub-encoded stream with its associated location information stream by sampling the SECI 130 at a time slot associated with the appropriate input module 140.

The location-dependent information in the sub-encoded stream is manipulated based on the location of the segment in the layout, which is associated with the output module 150, the compression standard that is used by the output module 150, and the associated location information stream (if present). The manipulation may change the location of the segment from the top left corner of the layout to its final location in the layout for transmission to the appropriate endpoints (not shown). A detailed description of an exemplary method for manipulating location-dependent information is disclosed below in conjunction with FIGS. 4a and 5. The output from AMM 152, which is referred to as a final segment's stream, may be transferred to output buffer 156.

Each one of the final segment's streams may be stored in the buffer 156 according to their location in the stream for transfer to the associated endpoints. The location in the stream depends on the location of the segment in the layout and on the type of the compression standard that is used by the given output module 150.

The output from buffer 156 is transferred over CVCI 105 to the appropriate network interface (not shown) and from there to the appropriate endpoint (not shown). Transferring of the information from the output buffer 156 to CVCI 105 is accomplished according to the type of CVCI 105. For example, if CVCI 105 is a TDM bus, output from buffer 156 is provided during the time slot associated with the output module 150 containing the output buffer 156.

If CVCI 105 or SECI 130 are packet-based, then the stream is divided into packets with appropriate headers. The packets are sent to the appropriate destination via a network interface (not shown).

Other exemplary embodiments (not shown) may use one or more input buffers in front of the AMM 152 instead of the output buffer 156. Each input buffer may be associated with one of the sub-encoded streams that will be composed in the compressed output stream of a composed layout generated by the output module 150. Each input buffer may grab and accumulate its associated sub-encoded stream from SECI 130. At an appropriate time according to the needs of the output stream of the final layout, AMM 152 may grab sub-encoded data from the appropriate input buffer, manipulate the location-dependent information according to the location in the layout of the segment associated with the sub-encoded stream, and transfer the manipulated stream over CVCI 105 to its destination.

The background module 154 may be used for storing sub-encoded video data of background images that may replace the video from the endpoints. The background images may be artificial images, slides, logos, black images, etc. The images may be organized in segments that fit the segments that are used in the layout. For the example of FIG. 1a, two sub-encoded streams that represent a background image may be stored for the two segments sizes: 11, and 12 to 16. Location-dependent information in the background data (if any) may be prepared as if the segment that contains the image is located in the top left corner of the layout.

The data from the background module 154 may be used for empty segments in the layout that are not associated with any of the conferees. For example, an empty segment may be in a conference with five conferees that use the layout of FIG. 1a.

The data in the background module 154 may be prepared before starting the conference. In one exemplary embodiment of the present invention, the segments that are stored in the background module 154 may have location-dependent information locating the segments at the top left corner of the layout. In such embodiment the information from the background module 154 is grabbed by the AMM 152 when needed. The AMM 152 may then manipulate the location-dependent information according to the actual location of the segment in the layout and transfer the final segment's stream to output buffer 156.

In other exemplary embodiments, data stored in the background module 154 may include location-dependent information. In such a case a plurality of segments may be stored in the background module 154 for each type of image, for each possible segment size, and for each possible location in the layout. Such an embodiment may need a larger storage volume for the background module 154 than in previous examples but may need less computational resources from AMM 152. In such embodiment the information from the background module 154 may be transferred directly to the output buffer 156 (not shown).

In another exemplary embodiment, BG module 154 may be installed in input modules 140a–c instead of the output modules 150. In such an embodiment, the functions of the background module 154 may be implemented by or in conjunction with buffer 148. In other embodiments, the background module 154 may be installed as an addition input to the one or more scalers 145a–c. In such a case, the data in the buffer is open image.

The conference manager (CM) 120 may manage the conference. The conference manager 120 receives control signals from the MCS (not shown) that convey the desired conference layouts and the parameters of the appropriate endpoints. The conference manager 120 provides each one of its input modules 140 their setup parameters. The setup parameters for the input modules 140 may include information relevant to pulling the appropriate input stream from CVCI 105 and how to decode, scale, sub-encode and transfer the one or more sub-encoded streams to SECI 130.

Moreover, the conference manager 120 provides the type of screen layout associated with each one of the output modules 150 associated with the conference, and loads the sub-encoded video data for blank screen portions into the background module 156. The conference manager 120 also provides the AMM 152 the address manipulation parameters that are used in composing the final layout associated with the output module 150. Address manipulation parameters may include information such as, but not limited to, information about the final location in the layout of the segment that contains the received sub-encoded stream, information regarding the algorithm for manipulating the location-dependent information in the sub-encoded stream, etc.

During the conference, conference manager 120 may control the timing and the synchronization of the various input modules 140 and output modules 150. In an exemplary embodiment of the present invention, after initiating the input module 140, the CM 120 synchronizes the timing of buffer 141 and decoder 143 with the received stream coming from the associated endpoint via CVCI 105. At the end of each received frame the decoder 143 may start decoding the frame. At the end of the decoding, the uncompressed video of the decoded frame is transferred to the appropriate one or more scalers 145a–c, which changes the resolution of the uncompressed video. The scaled video at the output of the scaler is stored in a temporary buffer (not shown) that may reside between the scaler 145 and sub-encoder 147, or may be part of the scaler or the sub-encoder. From this point, the operation of the one or more sub-encoders 147a–c and one or more output modules 150a–c may be synchronized and controlled by the conference manager 120.

Based on the required frame rate, the conference manager 120 may determine that a composed frame has to be built and transferred. Then the conference manager 120 may instruct the appropriate one or more sub-encoders 147a–c to start encoding a frame. In parallel, it may instruct the appropriate one or more output modules 150 to be ready for composing a new frame.

The CM 120 may control the rate controller function of each one of the sub-encoder 147a–c according to requirements associated output modules 150a–c by managing the bit budget per frame and the frame budget. The CM 120 may receive from the sub-encoders 147a–c information that is needed for managing their rate, such as the actual bit usage in the last encoded segment.

It should be noted that more than one frame rate may be needed. Each frame rate may require an output module as well as one or more sub-encoders. Exemplary methods of the operation of the conference manager 120 are described below in conjunction with FIGS. 2, 3 and 5.

In another exemplary embodiment of the present invention, an asynchronous mode may be used, in which the operation of the different input modules 140a–c and output modules 150a–c associated with a conference are not synchronized by CM 120. Each sub-encoder may run autonomously, according to compression parameter sets that have been assigned to the sub-encoder. These parameters may include, but not limited to, bit rate, frame rate, resolution, etc.

In an asynchronous embodiment, each output module 150 may have an input buffer (not shown), which may be divided into sections, with each section associated with a sub-encoded stream (which in turn is associated with a segment in the composed layout). Each input buffer section may accumulate the received sub-encoded stream from its associated sub-encoder without synchronization with the other input buffer sections or sub-encoders.

Whether an output module 150 determines that it is appropriate to deliver a new frame of composed layout may depend on the frame rate that is associated with the output module. The output module 150 may retrieve the earliest data from each section, manipulate the location-dependent information to match the final location of the segment in the composed layout, and transfer the manipulated stream toward its destination. If a section of the input buffer is empty, a skip segment may be sent as a replacement. The CM 120 may control the values of bit rate and frame rate for each one of the sub-encoders to comply the total bit rate and frame rate.

Figure 2:
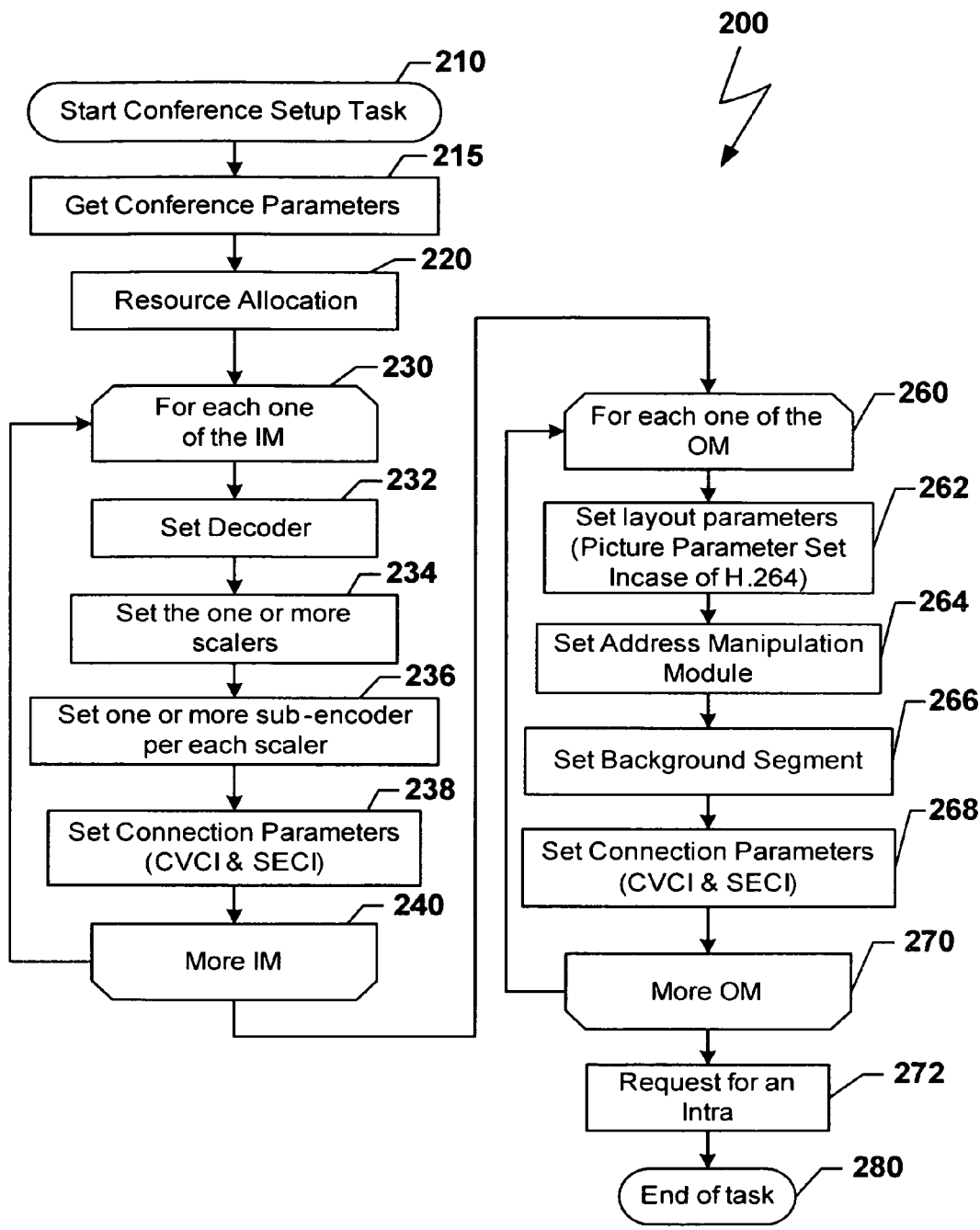
FIG. 2 is a flowchart showing an exemplary method for setting a conference module at the beginning of a conference or while changing layouts.

FIG. 2 illustrates a flowchart with relevant steps for performing an exemplary method 200 in accordance with an embodiment of the invention which may be used for setting a conference module 110a–c (FIG. 1b) during establishment of a videoconference. Upon receiving a command to start a conference 210, conference manager (CM) 120 receives conference parameters 215. The conference parameters may constitute the number of conferees, types of compression parameters that are used by the conferees, frame rates, bit rates, type of layouts, and other information relevant to the conference. The conference parameters may be defined in two stages. The first stage is during reserving the conference, at which point the person who orders the conference may define the type of one or more layouts that may be used, the number of conferees, and how to connect them to the conference, etc. The second stage is during establishment of the conference, at which point the MCU may negotiate with the each one of the endpoints in the conference to define other conference parameters such as the frame rate, bite rate, etc.

Based on the conference parameters the appropriate video resources (i.e. input modules 140a–c and output modules 150a–c) are allocated 220. The resources may be the minimal resources that may deliver the required conference parameters. A number of input modules 140 (FIG. 1b) may be allocated to the conference, and the number of modules utilized may depend on the approach being used. For example, in one approach, each input module 140 may be associated with a conferee for the entire conference. Therefore, the number of input modules may equal the number of participants. In another approach, each segment in the layout may be associated with an input module 140 and the association between the conferees and the modules may be dynamically varied during the conference according to the current segment in which the conferee is observed. Therefore, the number input modules 140 is defined according to the number of segments that are used in the one or more layouts. For example, in order to satisfy the needs of the conference with the layout that is illustrated in FIG. 1a, seven input modules 140 are needed: five for segments 12 to 16 (FIG. 1a) and one segment 11 each for the current speaker and one for the previous speaker. The input module 140 for the previous speaker may deliver two sub-encoded streams: one for segment 11 and one for the smaller segments 12 to 16. The input module 140 that is associated with the speaker (segment 11) may be switched from a previous speaker to the current speaker.

The decision on the number of the output modules 150 may likewise be based on different approaches. For example, according to one approach, an output module 150 may be assigned to each of the conferees for the entire conference such that the number of output modules equals the number of the participants in the conference. In another approach, each combination of layout and compression parameters may be associated with an output module 150. The output stream from each one of the output modules 150 is multicast to the endpoints that receive the same combination of layout and compression parameters. Therefore, the number of output modules is defined according to the number of combination of layouts and compression parameter sets that are used in the conference. For example, in order to satisfy the needs of the conference with the layout that is illustrated in FIG. 1a, the number of output modules 150 needed is seven: one for each conferee since each conferee has a different layout due to the fact that no conferee sees himself.

After allocating the appropriate number of input and output modules 140 and 150, the CM 120 (FIG. 1*b*) may start a loop over the allocated input modules 140. The loop starts in step 230 and terminates at step 240. For each one of the input modules 140 the decoder 144 may be adjusted to the appropriate setting according to the compression parameters, which are used by the conferee associated with the input module 140. As noted earlier, the compression parameters may comprise, but are not limited to, the compression standard, the bit rate, etc. For the example in which each one of the input modules 140 is associated with a conferee, the setting of the decoder may remain for the entire conference. For the example in which each one of the input modules 140 is associated with a segment size in the layout, the parameters of the decoder may be changed when the conferee associated with an input module 140 is replaced by another conferee.

After setting the decoder, the CM 120 (FIG. 1*b*) may define 234 the number of scalers 145*a*–*c* (FIG. 1*b*) that will be used in this input module 140 (FIG. 1*b*). The number of scalers 145*a*–*c* may depend on the number of different resolutions that are used by the different conferees' endpoints. For example, for a conference in which all the endpoints are using the same CIF resolution (352 by 288 pixels) and for the approach in which each input module 140 is assigned to a conferee for the entire conference, the number of scalers may equal the number of different segments sizes that a given conferee observes. Thus, for the conference illustrated in FIG. 1*a*, the number of scalers 145*a*–*c* in the input module 140 associated with conferee 'A' (the previous speaker) may be two scalers: one for segment 11 to support the layout 10 of the current speaker 'E', and one to support the small segments 12 to 16 to support the layout of the rest of the conferees. For this example, when a speaker is replaced, the number of scalers may be changed in the input modules 140 associated with the current speaker and with the previous speaker.

In another embodiment, each input module 140 may have a scaler for each possible size (or resolution) of segments that may be used. Therefore, to satisfy the needs of the conference illustrated in FIG. 1*a*, each input module 140 may have two scalers for the entire duration of the conference: one scaler to support the size of segment 11 and one to support the rest of the segments 12–16.

After defining the number of scalers 145 in the input modules 140, the scalers are adjusted 234 to reduce the resolution of the uncompressed video received from the decoder 143 to the resolution of the segment in the layout associated with the scaler. For example, to support the size of segment 11 (FIG. 1) the resolution is reduced to a ⅔ of a full screen for each axis, and to support the rest of the segments 12–16 the resolution is reduced to a ⅓ of a full screen for each axis. A filter for improving the quality of the scaler may be incorporated into each scaler fit the scale factor (e.g., ⅔ or ⅓ for each axis) used by the scaler.

After setting the one or more scalers 145 in the relevant input module 140, one or more sub-encoders 147 (FIG. 1*b*) are assigned 236 to each one of the scalers. The number of the sub-encoders depends on the number of compression parameter sets that are used by the different endpoints that receive compressed video from the relevant scaler. Compression parameter sets may include parameters such as, but not limited to, the compression standard, bit rate, etc. Among other settings, the sub-encoders 147 are adjusted to handle the first macro block of the compressed slice (FMIS) as macro block '0' (zero).

At step 238, the connection parameters are loaded into the relevant input modules 140 (FIG. 1*a*), which are used by the input modules to communicate with the CVCI 105 and to the SECI 130 (FIG. 1*b*). The connection parameters are based on the type of the CVCI 105 and SECI 130 used. For example, for a TDM bus, the connection parameters may include the relevant time slot. For a packet-based bus, the connection parameters may include the destination address of the packet. For a shared memory, the connection parameters may include sets of addresses, etc. The connection parameter set used with CVCI 105 reflects the association of the input module 140 with its current source. The one or more connection parameter sets used with SECI 130 reflects the association of the one or more destinations with the one or more sub-encoders 147 in the input modules 140 (FIG. 1*b*).

The CM 120 may check 240 if the current input module 140 is the last one needing adjustment. If so, the loop is terminated and method 200 continues to step 260. If there are more input modules 140 needing adjustment, then the next input module is selected and the method 200 returns to step 230.

After setting the appropriate inputs modules 140, the CM 120 (FIG. 1*b*) may start a loop over the allocated output modules 150. The loop starts in step 260 and terminates at step 270. For each one of the output modules 150 a layout parameter set is calculated 262 according to the layout associated with the output module 150. The layout parameter set may include parameters such as, but not limited to, the number of segments, the first macro block (MB) of each segment, the last MB of each segment, and location-dependent information such as, but not limited to, macro blocks addresses (MBA), motion vectors, quantizers, etc. In H.264, some of the layout parameters are part of the "Picture Parameter Set."

Next, the AMM 152 (FIG. 1*b*) is adjusted 264 according to the associated layout parameters. The adjustment may involve use of a set of algorithms for converting the location-dependent information for each one of the sub-encoded streams that are transferred via the output module 150 to fit their final location in the output stream of the output module 150. More information on such algorithms is disclosed below in conjunction with FIGS. 4*a* and 5.

In step 266, background segments are loaded into the output modules 150. The background segments may be used when a segment lacks input from an endpoint. There are Intra segments and Inter segments. The inter segments may include uncoded macro blocks.

At step 268, the connection parameters of the output modules 150 are loaded into the relevant output module, which are used by the output modules 150 to communicate with the CVCI 105 and SECI 130 (FIG. 1*b*). The connection parameters are based on the type of the CVCI 105 and SECI 130 used. For example, for a TDM bus, the connection parameters may include the relevant time slot. For a packet-based bus, the connection parameters may include the destination addresses of the packets. For a shared memory, the connection parameters may include set of addresses etc. The connection parameter set used with the CVCI 105 reflects the association of the output module 150 with its current destination, which may be one or more endpoints. The connection parameter set used with the SECI 130 reflects the current input modules 140 that deliver the segments to be processed by the output modules 150 into the output stream.

The CM 120 may then check 270 if the current OM is the last one needing adjustment. If so, then the loop is terminated and method 200 continues to step 272. If there are more output modules 150 needing adjustment, then the next output module is selected and the method 200 return to step 260.

At step 272 the conference module 110 is ready to conduct the conference and the CM 120 may instruct all the associated decoders to request an Intra frame from their associated endpoint. In parallel, the CM 120 may instruct all pertinent sub-encoders to deliver an Intra segment. At this point, initialization for the conference 200 is terminated 280, and the CM 120 may begin to control timing of conference (as disclosed below in conjunction with FIGS. 4a and 5) and/or managing changes in the conference parameters.

The following paragraphs disclose an exemplary method for handling changes in the layout that occur during a conference. In an exemplary embodiment in which the allocation of the resources is dynamically changed according to current needs of the conference, the CM 120 may determine if a change in the conference parameters requires additional input 140 or output 150 modules, and/or may modify one or more of the current input and output modules.

If during a communication session additional input modules 140 and/or output modules 150 (FIG. 1b) are needed, then CM 120 may perform a portion of method 200 (FIG. 2), specifically, from step 220 to step 280 as needed. Additional input or output modules may be needed, for example, when the number of conferees is increased, when additional segments are added to the layout, and/or when additional types of layouts are added, etc. If there is no need for additional input modules 140 and/or output modules 150, and only changes are needed in the current modules, then method 300 (FIG. 3) may be invoked. Of course, some changes may require both additional modules and modification of currently utilized modules, and in such cases at least portion of both methods (200, 300) may run in parallel, with unnecessary resources being released as necessary.

Other exemplary embodiments of the present invention may invoke such parallel tasking. Those tasks may replace the loop on the input modules (steps 230 to 240), and/or the loop on the output modules (steps 260 to 270). Each one of the plurality of tasks may be assigned to one allocated input module 140 or to one allocated output module 150. The tasks that are assigned to input modules 140 may comprise steps 232 to 238; the tasks that are assigned to output modules 150 may comprise steps 262 to 268. At the end of the last task, an Intra may be requested 272.

Figure 3:
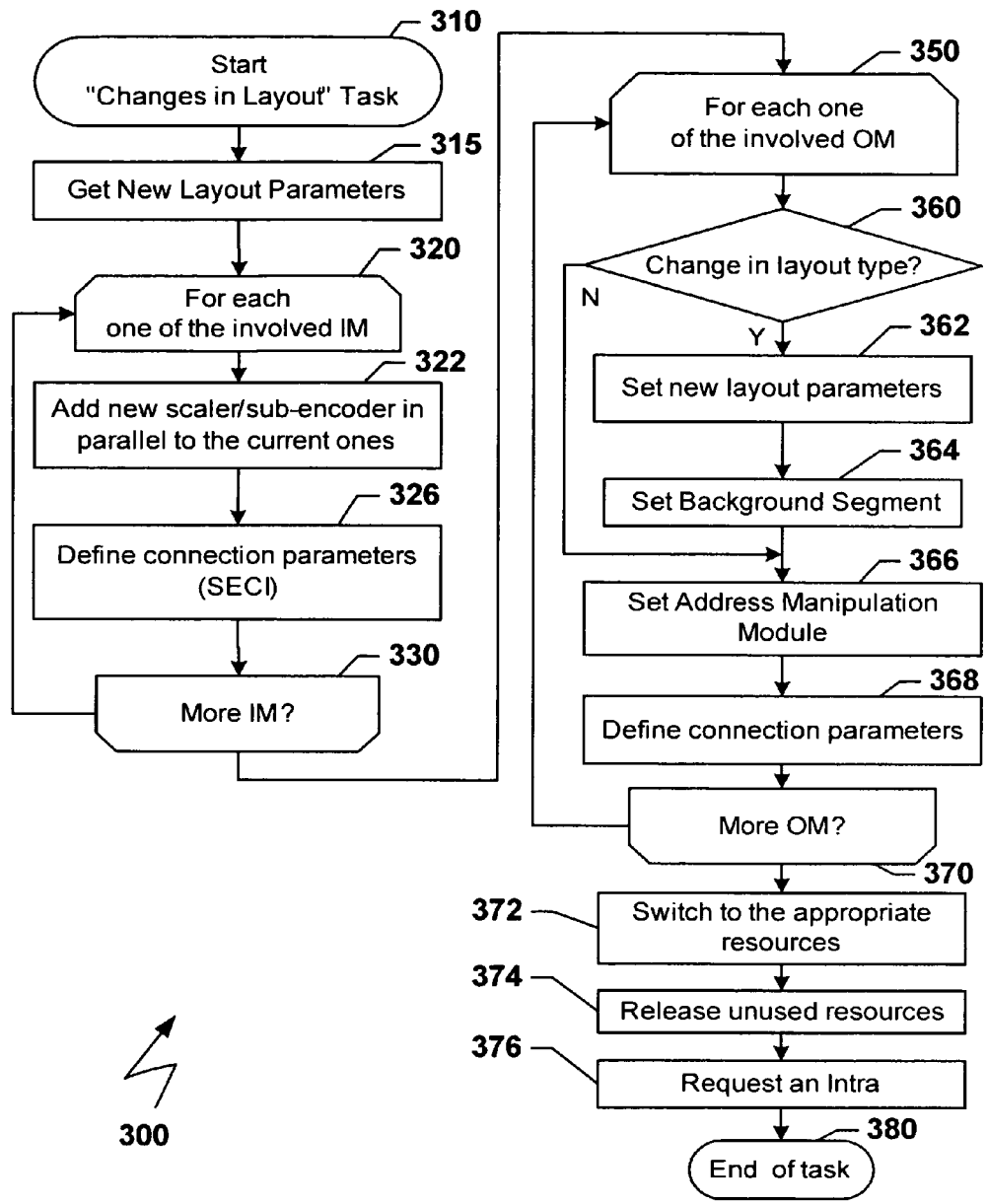
FIG. 3 is a flowchart showing an exemplary method of handling changes in the layout with dynamical resource allocation according to the current needs of the conference.

FIG. 3 illustrates a flowchart of an exemplary method 300 for handling changes in the current input modules 140 and/or output modules 150 useful, for example, when there is a change of a location in the layout. Method 300 may be used when the configuration of the conference modules 110a–c (FIG. 1b) allows for dynamic resource allocation. Such allocation is accomplished according to the current needs of the conference.

The method 300 is invoked 310 when a change in the layout is requested. The request for the change may be issued automatically, for example, when the MCU 100 determines that a speaker has been replaced, or manually, for example, by the operator or the appropriate conferee who would like to change the layout.

Upon initiation 310, the CM 120 may receive 315 the new layout parameter set and determines which one of the current input modules 140 and/or output modules 150 will be affected by the change. For example, in the conference that is illustrates in FIG. 1a, if the current speaker 'E' is replaced by a new speaker, for example by 'D', then the following changes may ensue. The scaler 145 of the input module 140 of the new speaker 'D' is replaced by a scaler that fits the size of segment 11. The input module 140 of the current speaker 'E' may need an additional scaler 145 and its associated one or more sub-encoders 147 to fit the small size of segments 12 to 16 for the layouts of conferees 'A', 'B', 'C', 'G' and 'F'. The old scaler 145 and one of the associated sub-encoders 147 are kept to support segment 11 in the layout of the new speaker 'D'. The one sub-encoder that is kept is the one that fit the compression parameters of 'D'. If there are more sub-encoders 147, they may later be released with other unused resources. The input module 140 of the previous speaker 'A' is changed, and the scaler that fits the size of segment 11 with its associated sub-encoder are not needed and may be released with the rest of the unused resources at an appropriate time.

After determining which one of the input modules 140 will be involved in the change, a loop is initiated 320 to initiate the change to that input module 140. The loop starts at step 320 and terminates at step 330. For each one of the relevant input modules 140, new sets of scalers 145 and one or more sub-encoders 147 are added 322 in parallel to operations performed on the current sets. The decision on the number of added elements, scalers and sub-encoders, and their settings is based on the approaches that are disclosed above in conjunction with FIG. 2 (steps 234 and 236).

The connection parameters of the added elements of the affected input module 140 are loaded 326 into the relevant input module. The connection parameters are used by the new sub-encoders 147 to communicate with SECI 130 (FIG. 1b).

At step 330, the CM 120 may check if the affected input module 140 is the last one needing change. If so, then the loop is terminated and method 300 continues to step 350. If there are further input modules 140 to be changed, a next input module is selected and the method 300 return to step 320.

After terminating the loop 330, a new loop is initiated 350 to change affected output modules 150. The loop starts at step 350 and terminates at step 370. For each one of the affected output modules 150, method 300 may create a new output module that will replace the old one, or may change parameters of existing output module 150. If the change 360 concerns the type of the layout—for example, if the new layout has different number of segments or different size of segments—then a layout parameter set is calculated 362 according to the new layout associated with the relevant output module 150. The new layout parameter set is disclosed above in step 262. Then background segments 154 (FIG. 1b) are updated 364 according to the changes in the size of the segments. If 360 the change in the layout is a change in the location of one or more conferees, or a conferee is disconnected, then method 300 proceeds directly to step 366.

At step 366, the AMM 152 (FIG. 1b) is adjusted according to the change in the layout. For example, if the change constitute a disconnected conferee, AMM 152 is modified to place background data from background module 154 (FIG. 1b) in the segment associated with the disconnected conferee. Or if a location of a conferee is switched with another conferee in the layout, the AMM 152 is adjusted accordingly. Such adjustment may be a set of algorithms for converting the location-dependent information of each of the sub-encoded streams that are transferred via the output module 150 according to their new final location in the output stream of the output module.

Thereafter, the connection parameters for the relevant output module 150 are defined and loaded 368, which are used by the output module to communicate with the CVCI 105 and from the SECI 130 (FIG. 1b). At step 370, the CM 120 may check if the currently affected output module is the last one. If so, then the loop is terminated and method 300 continues to step 372. If there are more output modules 150 to be changed, then the next involved output module is selected and the method 300 returns to step 350.

At step 372, the new resources of affected input 140 and output 150 modules are ready. A command to switch to the appropriate resources is given and the unused resources are released 374. CM 120 may instruct 376 the relevant sub-encoders to deliver an Intra segment. Then the "change in the layout" task is terminated (380).

In another embodiment of the present invention, in which an asynchronous mode is used, after requesting an Intra sub-encoded stream, CM 120 may release the relevant sections of the input buffer of the output modules 150 (not shown).

Other exemplary embodiments of the present invention may run a plurality of tasks in parallel that may replace the loops that are illustrated in FIG. 3 (steps 320 to 330 and steps 350 to 370).

Figure 4A:
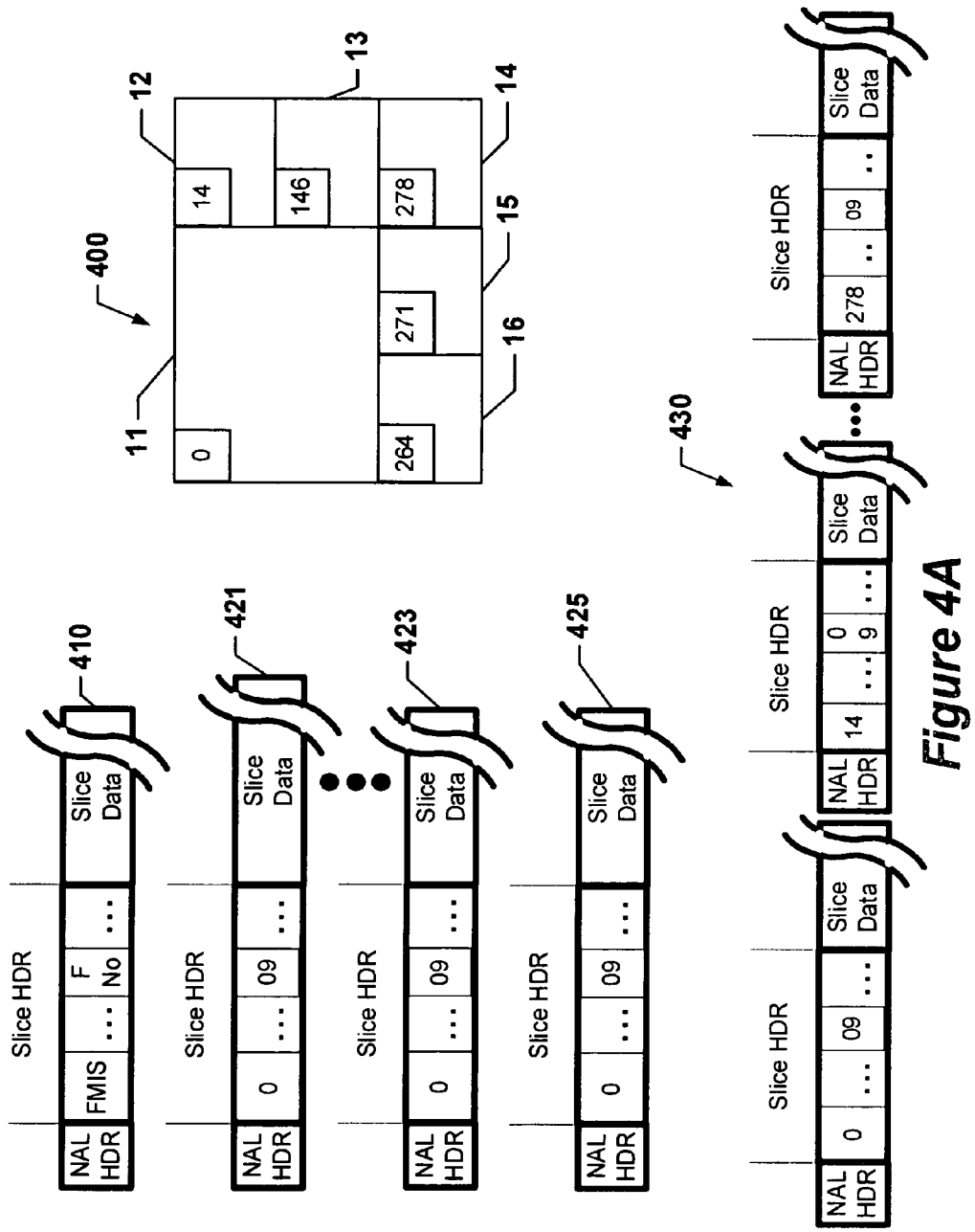
FIG. 4a illustrates exemplary sub-encoded streams and composed stream while using H.264 compression standard.

FIG. 4a illustrates a layout 400, a plurality of sub-encoded streams 410 to 425, and a composed output stream 430 with relevant location-dependent information. In the example of FIGS. 4a and b, the sub-encoded streams as well as the composed output stream are compressed according to H.264 compression standard.

Stream 410 illustrates some relevant fields in a NAL unit (Network Adaptation Layer) in video communication system using the H.264 compression standard. The present invention may use a Slice NAL-type header format. This type of NAL unit includes a NAL header, a slice header and a string of slice data. The relevant fields, for the present invention, are located in the slice header and include the FMIS (First MB In Slice) field and the Frame number field (F No) in stream 410. The information about the first macro block (MB) in the slice is a location-dependent parameter. In H.264, the FMIS in the first NAL of a segment is referred as the "top_left" parameter in the "Picture Parameter Set" that is transferred between the MCU and the endpoints.

H.264 divides the frame into one to eight slice-groups. Each slice-group is dedicated to one area in the frame. For example, H.264 may refer to each segment in the layout of FIG. 1a as a slice-group.

Layout 400 represents the layout of the conference that is disclosed above in conjunction with FIG. 1a. Layout 400 demonstrates the first macro block in slice (FMIS) of each one of the segments (slice-groups). The FMIS of the first segment (slice-group) 11 is MB '0'; the FMIS of the second segment (slice-group) 12 is MB '14'; the FMIS of the third segment (slice-group) 13 is MB '146'; the FMIS of the fourth segment (slice-group) 14 is MB '278'; the FMIS of the fifth segment (slice-group) 15 is MB '271'; and the FMIS of the sixth segment (slice-group) 16 is MB '264'.

Figure 4B:
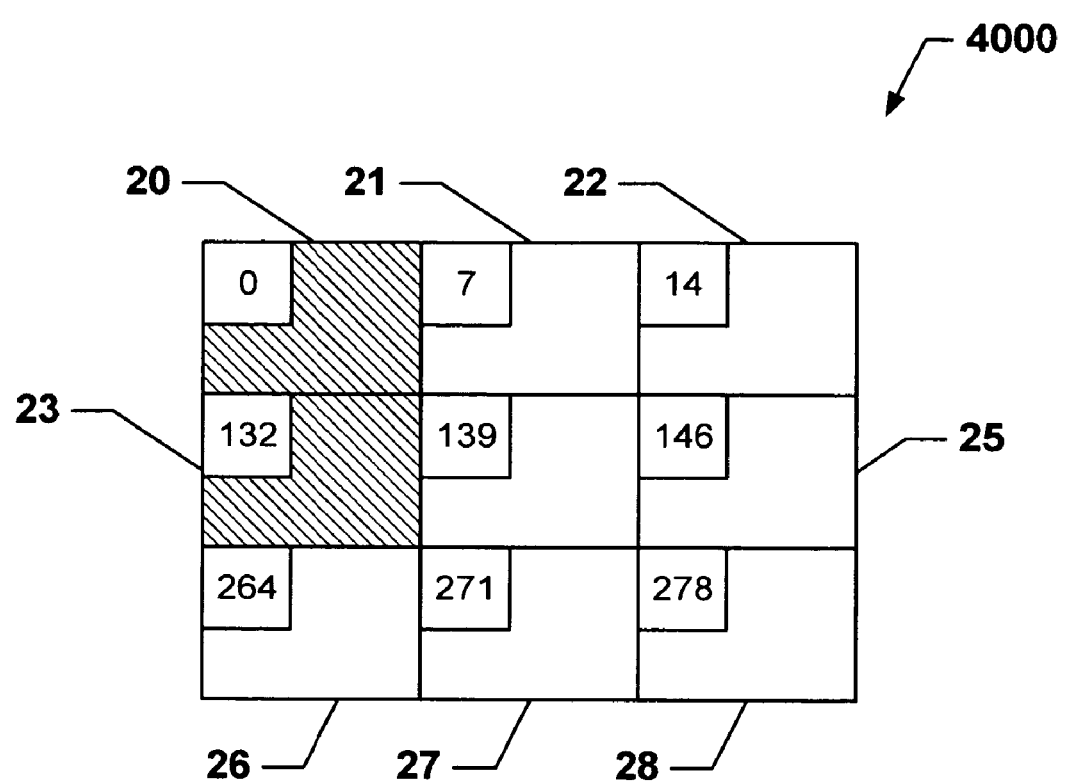
FIG. 4b illustrates an exemplary layout with nine segments.

If a layout has more than eight segments as in the example of layout 4000 in FIG. 4b, which has nine segments, 20 to 28, assigning each segment to a slice-group is not allowed because H.264 is limited to maximum eight slice-groups. To overcome this limitation, an exemplary embodiment of the present invention may combine two or more segments into one slice-group. The segments that are included in the same slice-group may not share any line in the raster scan on the display. Thus, in the example of FIG. 4b, segments 20 and 23 may share the same slice-group, but segments 20 and 21 cannot share the same slice-group because they share one or more raster scanning lines. The AMM 152 (FIG. 1b) is ultimately responsible for defining the slice-groups, and the definitions of the slice-groups are delivered to the appropriate end points in the "picture parameter set." Note that combining two or more segments into one slice-group may be used also in conference that has eight or less segments.

Returning now to FIG. 4a, streams 421, 423 and 425 show sub-encoded streams from the different sub-encoders 147a–c (FIG. 1b). Note that the FMIS of each one of the streams is MB '0', indicating that each one of the sub-encoders encodes its slice as if it is located in the top left corner of the layout. The frame number in all the sub-encoded streams is the same, which indicates that the operation of the sub-encoders may be synchronized by the CM 120 (FIG. 1b).

Composed output stream 430 reflects the operation of the AMM 152, which composes the relevant sub-encoded streams into one stream. It can be observed that the FMIS of each one of the NALs in the stream was manipulated according to the location of the segment that is associated with the NAL. For example, the FMIS of the first NAL in the composed stream 430 is MB '0' indicating that the associated segment is segment 11. The FMIS of the second NAL is MB '14' indicating that the NAL is associated with segment 12, and in the last NAL the FMIS is MB '278' indicating that the last NAL is associated with segment 14. In the exemplary embodiment of the present invention, the AMM 152 is the module that modifies the field of the FMIS according to the location of the associated segment in the layout.

Figure 5:
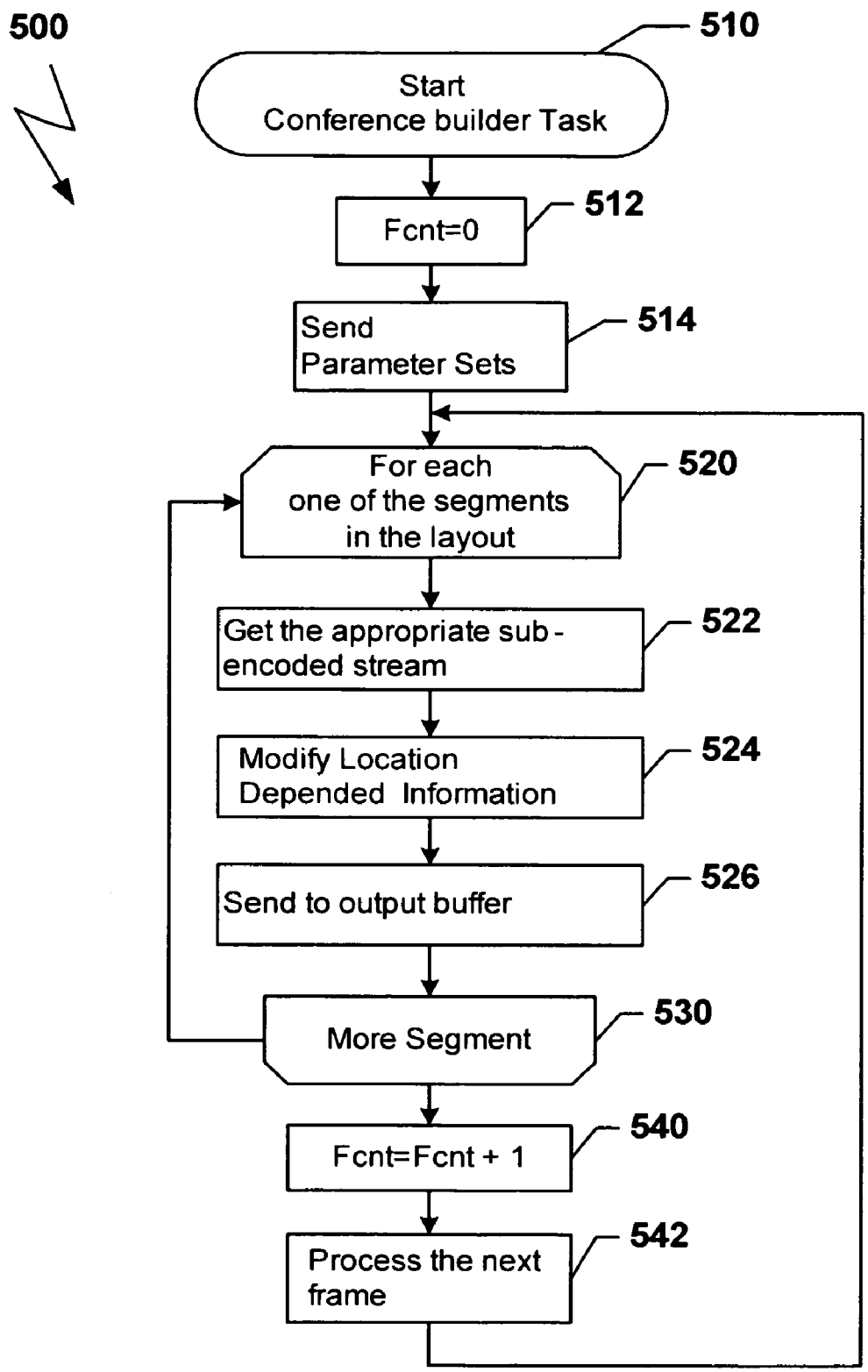
FIG. 5 is a flowchart showing an exemplary method for composing an output stream.

FIG. 5 illustrates a flowchart for an exemplary method 500 for composing the output stream by an output module 150 (FIG. 1b). Method 500 may start 510 when all the relevant resources, input modules and output modules, are ready, and at an appropriate time a command requesting an Intra frame is given to the relevant sources. Thereafter the frame counter 512 is reset, and "Picture Parameter Set" and "Sequence Parameter Set" information are sent 514 to the relevant output modules 150 and the relevant endpoints. Such information includes, among other parameters, information about the slice-group NALs, frame size, and the method for preparing the frame number field. More information about such information and its utility may be found in with reference to the compression standard being used (e.g., H.264).

A loop from step 520 to step 542 is started for building the stream of composed frames, in which each cycle in the loop creates a composed output frame. An internal loop from step 520 to step 530 is initiated over all the segments that compose a frame in the relevant layout. For each segment in the layout, AMM 152 (FIG. 1b) may receive 522 the appropriate sub-encoded stream from the SECI 130 (FIG. 1b) for a segment that is associated with an endpoint or from the background module 154. The data from the background module 154 may be an Intra slice or an Inter slice depending on current needs. The background data may be used when the segment is not associated with an endpoint, for example when an endpoint is disconnected or when the layout has more segments than conferees.

In another embodiment of this invention, an asynchronous mode may be used. In such embodiment, AMM 152 (FIG. 1b) may receive 522 the earliest sub-encoded segment stored in the relevant section (not shown) of the input buffer 141. If the section does not contain a full segment, AMM 152 (FIG. 1b) may send a skip NAL. A skip NAL is a NAL in which all MBs are skipped.

In step 524 the location-dependent information in the retrieved sub-encoded stream is manipulated to fit the final location of the segment in the layout. In case of using H.264, the FMIS is modified to reflect the location of the first MB in the final layout. For example, if the retrieved sub-encoded stream belongs to segment 13 in FIG. 4*a*, then the FMIS field is changes from '0' to '146'.

In some cases the sub encoder 147*a–c* (FIG. 1*b*) may divide the sub-encoded stream of its associated segment into two or more NALs to meet the size limitation of a NAL. The number of NALs per segment may be changed dynamically during the conference. The two or more NALs that compound the segment have the same frame number. The FMIS of the first sub-encoded NAL of the segment is zero and the FMIS in the other sub-encoded NALs of the same segment may be any MB address that the NAL starts from.

The following algorithm may be used for manipulating the FMIS of a NAL in order to place it in the right location in the composed frame that is sent to the endpoints. The following are parameters that can be used to calculating the new FMIS:

FMISa: the first MB of the segment, in the composed layout, to which the currently-processed sub-encoded stream belongs. For example, the value of FMISa of segment 15 (FIG. 4*a*) is '271'.

FMISb: the first MB of the NAL, in the sub-encoded stream, which is currently processed by AMM 152 (FIG. 1*b*). The value of FMISb may be any number from '0 to the number of MBs in the segment associated with this sub-encoded stream.

FMISb': the first MB of the NAL that will be delivered by AMM 152 (FIG. 1*b*). This value indicates the final location in the composed layout that will be displayed on the appropriate endpoints.

SW: the width, in MBs, of the current segment. For the example of segment 15, the SW is seven MBs.

FW: the width of the frame in MBs. For the example of layout 400 (FIG. 4*a*), the FW is twenty-two MBs.

Q: the quotient that is received by dividing FMISb by SW.

R: the residual that is received by dividing FMISb by SW.

The formula that may be used for calculating the new value of the FMIS of the current NAL to fit the appropriate location on the screen of the endpoint is:

$$FMISb'=FMISa+Q*FW+R.$$

When using compression standards other than H.264, additional fields may also be modified, such as, but not limited to, macro blocks address (MBA), motion vectors, quantizer, etc.

The modified sub-encoded stream is sent 526 via the output buffer 156 and the CVCI 105 (FIG. 1*b*) to the relevant one or more endpoints via appropriate network interfaces (not shown). After handling a segment, a decision is made 530 whether the segment is the last one in the layout. If not, method 500 returns to the beginning of the loop 520 and handles the next segment. If there are no more segments, then method 500 continues increments the frame counter by one 540 and instructs the relevant sub-encoders to process a new frame 542. The method 500 then returns to step 520 for handling a new composed frame. In another embodiment of this invention, an asynchronous mode may be used, in which case the sub-encoders may deliver a segment according to their own timing in lieu of step 542.

Other exemplary embodiments of the present invention may instruct the appropriate sub-encoders 147*a–c* (FIG. 1*b*) at the end of step 526 to start encoding a new sub-encoded stream.

Another exemplary embodiment of the present invention may distribute the modules of the present invention among the participant endpoints and the MCU 100. Each one of the endpoints may also perform a portion of the functionality of the input module 140 (FIG. 1*b*). For example, each end point may have one or more scaler and one or more sub-encoder. (The decoder portion of the input module is not needed in the endpoint). Thus, each endpoint may deliver one or more sub-encoded streams in the required one or more resolutions and compression parameter sets.

During establishment of a conference, the MCU 100 may instruct each of the endpoints to send one or more sub-encoded streams. The number of sub-encoded streams may be a function of the number of different sizes of segments in which tile endpoint may be displayed and the number of compression parameter sets that are used in the session.

Based on the connection parameter set of each of the sub-encoded streams, CM 120 (FIG. 1*b*) may assign the appropriate sub-encoded streams to a location in its layout and may instruct the appropriate AMM 152 (FIG. 1*b*) to get the appropriate sub-encoded streams and to assign them to their location in the layout. In such an embodiment the sub-encoded streams from the endpoint may be transferred over 105 CVCI and SECI 130 may not be needed. During a conference, CM 120 may request one or more endpoints to send an Intra sub-encoded stream.

In such distributed embodiment, the CM 120 and the endpoints many establish a channel of signaling to exchange control information. Such signaling and control may be communicated according to "H.320 non standard information" or "H.323 non standard information" options, depending on the communication standard that is used for the conference. Other embodiments of the present invention may use other methods to establish signaling and control in this manner.

The exchanged information may include, but is not limited to, the compression parameter set. In such an embodiment, the endpoint may send one or more sub-encoded streams, following the CM 120 request, depending on the required number of compression parameter sets and the different segment sizes that are associated with the endpoint.

In a mixed-mode conference, some of the endpoints configured to operate in a distributed mode may be connected in a distributed mode while the other endpoints unconfigurable in the distributed mode may be associated with input modules 140*a–c* (FIG. 1). In such a mixed conference, CM 120 may use inter-MCU signaling to internally communicate with the input modules 140*a–c* (FIG. 1) and may use channel signaling to communicate with the endpoints that are connected in the distributed mode.

In this application the words "unit" and "module" may be used interchangeably. Anything designated as a unit or module may be a stand-alone unit or a specialized module. A unit or a module may be modular or have modular aspects allowing it to be easily removed and replaced with another similar unit or module. Each unit or module may be any one of, or any combination of, software, hardware, and/or firmware.

Those skilled in the art will appreciate that the present invention can be either in the form of additional software residing in the MCU that performs the methods that have been disclosed in the present application, or in the form of additional hardware which has been added to the MCU, or may be distributed among the MCU and the endpoints.

Furthermore, those skilled in the art will appreciate that the present invention can be used in variety of compression standards such as, but not limited to, H.264, H.263, H.261, MPEG 1, MPEG 2, and MPEG 4 part 10. As mentioned earlier, information concerning on those standard may be found at websites www.itu.int or www.mpeg.org.

Each of the verbs, "comprise," "include," and "have," and conjugates thereof, are used to indicate that the object or objects of the verb are not necessarily a complete listing of members, components, elements, or parts of their respective subjects or verb.

The present invention has been described using detailed descriptions of embodiments thereof that are provided by way of example and are not intended to limit the scope of the invention.

The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art. The scope of the invention is limited only by the following claims.

What is claimed is:

1. A method for use in composing two or more compressed video input streams into at least one compressed output stream of a composed layout, the method comprising:
   converting each one of the two or more compressed video input streams into one or more sub-encoded stream, wherein each one of the sub-encoded streams is associated with a segment in the at least one compressed output stream of the composed layout;
   manipulating the one or more sub-encoded streams according to the location of its associated segment in the composed layout of the compressed output stream; and
   transferring the manipulated one or more sub-encoded streams as the compressed output stream.

2. The method of claim 1, further comprising:
   transferring the one or more sub-encoded streams of each one of the two or more compressed video input streams to a sub-encoded common interface; and
   getting from the sub-encoded common interface the one or more sub-encoded streams that are associated with the output stream.

3. The method of claim 1, wherein converting each one of the two or more compressed video input streams into one or more sub-encoded stream further comprises changing the resolution of sub-encoded stream.

4. The method of claim 1, wherein converting each one of the two or more compressed video input streams into one or more sub-encoded stream is independent of the location of the associated segment of the sub-encoded stream in the compressed output stream.

5. The method of claim 1, wherein converting each one of the two or more compressed video input streams into one or more sub-encoded streams is accomplished assuming the associated segment of the sub-encoded stream is located in the top left corner of the composed layout.

6. The method of claim 1, wherein the compressed output stream conforms to the H.264 standard.

7. The method of claim 1, wherein the compressed output stream conforms to the MPEG 4 part 10 standard.

8. The method of claim 1, wherein the one or more sub-encoded streams are not QCIF compliant.

9. The methods of claim 6 or 7, further comprising the step of combining two or more segments into one slice-group.

10. The method of claim 9, wherein the two or more segments that are combined into one slice-group do not share a raster scan line.

11. The method of claim 1, wherein the compressed output stream conforms to a standard selected from a group consisting of H.263, MPEG 1, MPEG 2 and MPEG 4.

12. A method for use in composing sub-encoded video input streams from two or more endpoint into at least one compressed output stream of a composed layout, the method comprising:
   receiving the sub-encoded video input streams from two or more endpoints;
   associating each one of the two or more sub-encoded video input streams to a segment in the composed layout;
   manipulating the received sub-encoded video input streams from two or more endpoint according to the location of its associated segment in the composed layout of the compressed output stream; and
   transferring the manipulated two or more sub-encoded streams as the compressed output stream.

13. The method of claim 12, wherein the compressed output stream conforms to a standard selected from a group consisting of H.263, MPEG 1, MPEG 2 and MPEG 4.

14. The method of claim 12, wherein the compressed output stream conforms to the H.264 standard.

15. The method of claim 12, wherein the compressed output stream conforms to the MPEG 4 part 10 standard.

16. The method of claim 12, wherein the one or more sub-encoded streams are not QCIF compliant.

17. A system comprising:
   at least two input modules being operative to
      receive a compressed input stream; and
      deliver one or more sub-encoded streams;
   at least one output module being operative to
      receive two or more sub-encoded streams; and
      deliver a compressed output stream of a composed layout; wherein the output module manipulates location-dependent information in the sub-encoded stream according to its location in the composed layout.

18. The system of claim 17, wherein the compressed output stream conforms to the H.264 standard.

19. The system of claim 17, wherein the compressed output stream conforms to the MPEG 4 part 10 standard.

20. The system of claim 17, wherein the compressed output stream conforms to a standard selected from a group consisting of H.263, MPEG 1, MPEG 2 and MPEG 4.

21. The system of claim 17, wherein the one or more sub-encoded streams are not QCIF compliant.

22. The system of claim 17, further comprising:
   a compressed video common interface; and
   a sub-encoded common interface;
   wherein the compressed video common interface is operative to carry the compressed input streams and the compressed output stream and wherein the sub-encoded common interface is operative to carry the sub-encoded streams between the input modules and the output module.

23. A method for use in composing two or more compressed video input streams into at least one compressed output stream of a composed layout, the method comprising:
   converting each one of the two or more compressed video input streams into two or more sub-encoded stream, wherein each one of the sub-encoded streams is associated with a different sized segment in the at least one compressed output stream of the composed layout;

manipulating the one or more sub-encoded streams according to the location of its associated segment in the composed layout of the compressed output stream; and transferring the manipulated one or more sub-encoded streams as the compressed output stream.

* * * * *